May 14, 1946.          J. M. HALL          2,400,460
DEHYDRATED EDIBLE PRODUCT AND METHOD OF OBTAINING SAME
Filed Oct. 1, 1942
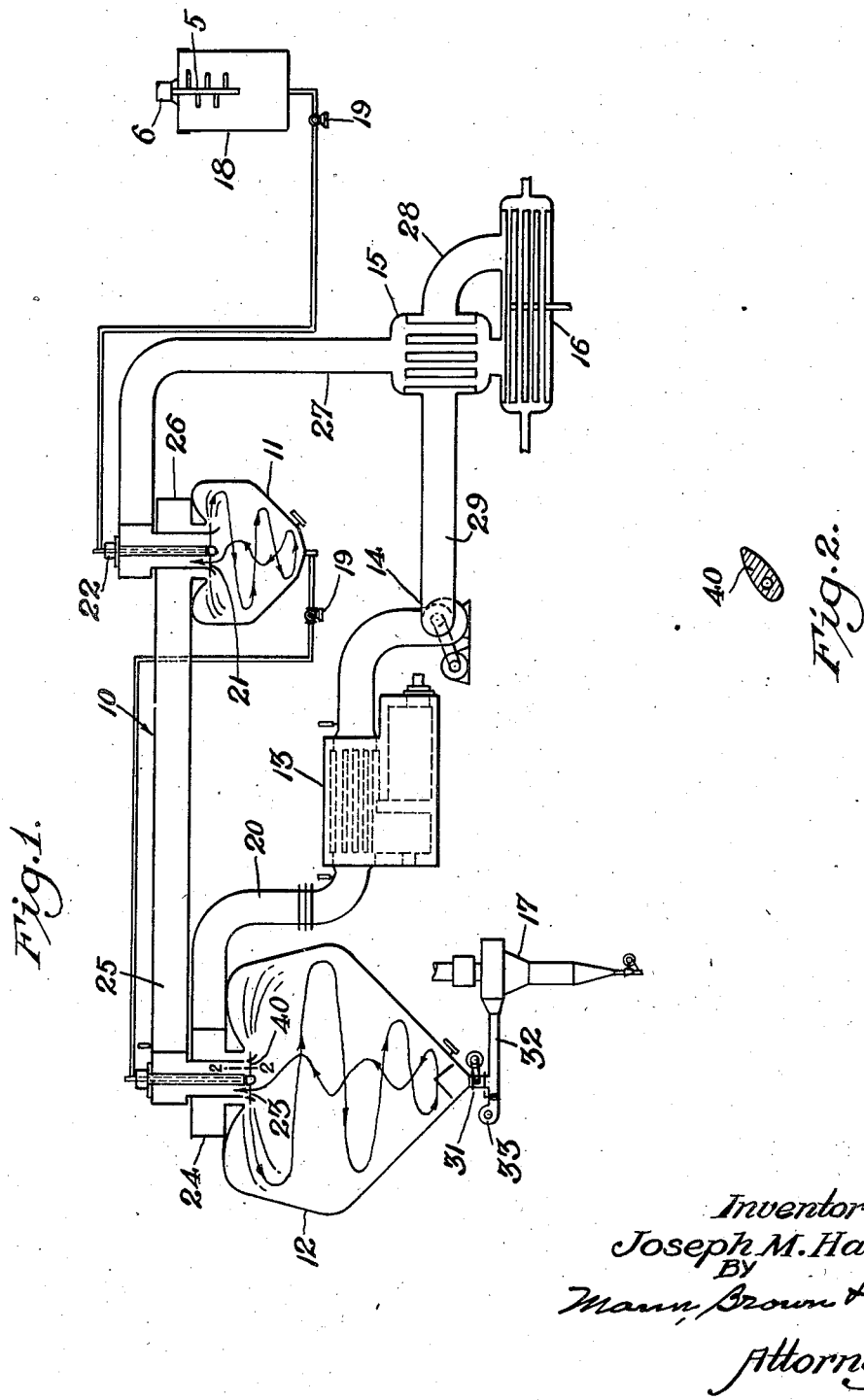
Inventor
Joseph M. Hall
BY
Mann, Brown & Co.
Attorneys.

Patented May 14, 1946

2,400,460

UNITED STATES PATENT OFFICE 2,400,460

DEHYDRATED EDIBLE PRODUCT AND
METHOD OF OBTAINING SAME

Joseph M. Hall, Chicago, Ill., assignor to Drying
& Concentrating Company, a corporation of
Delaware Application October 1, 1942, Serial No. 460,399

11 Claims. (Cl. 99—206)

This invention relates to desiccated foods or edible products, as meats, fruits and vegetables, and the juices thereof, and the method of dehydrating the same.

The principal object of the invention is the provision of a new and improved method of dehydrating and for concentrating edible products, fruit and vegetable jucies, and the like.

A further object of the invention is the provision of a new and improved method of dehydrating fruit and vegetable juices, such as orange, tomato, and the like, in systems employing currents of air in the dehydration operation.

Another object of the invention is the provision of a new and improved dehydrated or concentrated food product, whether of vegetable or animal origin, and the method of obtaining same.

Another object of the invention is the provision of a new and improved dehydrated food product comprising dehydrated meats, soups, juices, and fruit and vegetable products containing fats or sugars, or fats and sugars, that are not tacky or hygroscopic and that will retain their essential characteristics for long periods of time.

A further object of the invention is a new and improved method of dehydrating foods or edible products, such as certain fruits and vegetables and the juices of same, such, for instance, as orange, tomato, and the like, that is simple, inexpensive, and economical to initiate and to practice on a production scale.

Other and further objects and advantages will appear from the following description and from the accompanying drawing, in which Fig. 1 is a schematic view of an apparatus for performing the drying or dehydrating operation; and Fig. 2 is a section on the line 2—2 of Fig. 1.

In the dehydration of certain fruit and vegetable juices, such as the juices of oranges, tomatoes, and the like, by way of example, it is common practice to employ heated rolls over which the juice is caused to flow in a thin film and to scrape the dried particles from the face of the rolls during their rotation, but this is an expensive method. The method of dehydrating juices of vegetables and fruits by currents of heated air, as by spraying the juice into the conventional cyclone type of driers employing spirally moving currents of air, has not heretofore proved successful due to the fact that during the process the particles become tacky in an intermediate stage of drying and stick to the walls of the dehydrating chamber when thrown against the same by the centrifugal action of the spirally moving air. This necessitates scraping the walls for removing the material and consequently such a method is impractical.

Likewise, in dehydrating meats as well as certain fruits and vegetables, the product in an intermediate stage of dehydration becomes tacky or sticky and will adhere to the walls of the dehydrating chamber unless provision be made to prevent this adherence.

The present invention seeks to remedy this difficulty by treating the edible products in such a manner, before the drying operation, that they may be dehydrated in the conventional cyclone type of dehydrator. The fats of the meats, and the fats and sugars of certain of the vegetables and fruits, cause these products to become tacky or sticky in the intermediate stage of dehydration.

It has been discovered that if meats, broths, soups, fruits and vegetables, and juices of fruits and vegetables, be treated with a liquid containing proteins, such, for instance, as the protein contained in soy beans, the blood of animals, or the whites of eggs, and the like, in the required amount, the resulting liquid product may be dehydrated as efficiently as milk, or the like, in the cyclone type of drier. Proteins being tasteless, their addition does not change the characteristic taste of the dehydrated product. This is considered an important feature of the invention. For practical use soy bean meal is a valuable source of proteins. The dry soy bean has an exceedingly high percentage of proteins, and most of these remain in the meal after the oil has been extracted. This meal, being rich in proteins, is admirably adapted for use in preventing the foods from becoming tacky during dehydration, because in extracting the oil from the soy bean meal a very large portion of the characteristic soy bean taste is removed. The meal is inexpensive, whereas the protein extracted from the soy bean, or obtained from other sources, is more or less expensive.

A further important fact is that defatted soy bean meal is substantially colorless when mixed with water, or at least is of such a character as not to produce a change in color when added to a food product. When the soy bean meal is mixed with water it forms a viscous solution that is of transparent character with a faint green cast, being similar in appearance to egg white. Since the defatted soy bean meal is substantially tasteless, it may be added to any food product without change in the characteristic flavors thereof.

The amount of protein employed will vary with the different products dehydrated; that is, the amount required depends on the amount of fats and/or sugars contained in the product. It is only necessary to employ enough protein to prevent the product from becoming tacky during the dehydration operation. In the case of meats, the more fat the meat contains the more protein is required to prevent the product from becoming tacky during the dehydration operation. In practice, the protein employed may be in dry powder form or dispersed in water, but in either event it is thoroughly mixed with the product and the product reduced to the proper consistency to be treated in the dehydrator. The amount of protein to be added to the juice depends on circumstances.

It has been found that excellent results may be obtained, in certain fruit and vegetable juices, if the amount of protein in the final dehydrated product amounts to at least about 25% of such product. For instance, many fruit and vegetable juices contain proteins, and where the percentage is low, as in oranges, which is about .8%, lemons, about .4%, and fresh tomatoes, which is about .9%, then sufficient protein should be added to make a total of 25% of the dried particles.

In order to dehydrate meats, fruits and vegetables, they must be reduced to such a finely divided state that when water, or the liquid mixture of protein and water, has been added to the comminuted product it will be of such consistency that it will be readily discharged through the spray. Any suitable means may be employed for comminuting or reducing the product to a finely divided condition; meats, for instance, may be treated in a hammer mill which reduces the particles to the proper fineness. It may, of course, be comminuted in any well known manner. The liquid product may be prepared in any suitable manner. In dehydrating juices of fruits and vegetables, the liquid product may be thinned sufficiently by the addition of the protein mixture, but if not water may be added. In meats, the protein mixture added may be sufficient to produce a liquid product of the proper consistency to be sprayed readily, but if not it may also be thinned.

The drawing discloses one form of apparatus that has proved practical in dehydrating meats and various other products. It is highly successful in treating orange and tomato juices with proteins from soy beans, the whites of eggs, and also with proteins obtained from blood.

Any suitable apparatus may be employed for dehydrating the juices. That shown, which is by way of example only, is similar to that disclosed in my United States Patent No. 2,289,191, dated July 7, 1942.

This apparatus 10 comprises an evaporator chamber 11 in which the juice is concentrated, and which may be termed the first stage evaporator; an evaporator or dehydrator chamber 12, in which the concentrate is dehydrated, and which may be termed the second stage evaporator; a heater 13 for heating the air in the system; a fan 14; a heat exchanger 15; a condenser 16 for removing moisture from the circulated air; and a collector 17. The apparatus is also provided with a reservoir 18 for containing the juice comminuted product to be dehydrated, and which is provided with a stirrer 5 operated by a motor 6. A pump 19 is employed for transferring the liquid product from the reservoir 18 to the spray mechanism 21, which is rotated by a motor 22 for spraying the liquid into the first stage evaporator 11 for concentrating the same. The concentrate is collected in the bottom of the evaporator 11, and is transferred to a spray mechanism 23 where the concentrate is sprayed by the rotating spray member 23 into the dehydrator or second stage evaporator 12.

The drying medium for the system is a suitable gas, such as air, which, in the form of construction shown, is in a closed circuit and is conducted through the system in a direction counter to that of the liquid product. In tracing the air through the circuit and beginning at the fan 14, the air passes through a heater 13, where it is heated to a suitable temperature, and then passes through a conduit 20 into a snail 24 into the second stage evaporator 12, where it is discharged across the spray nozzles of the spray member 23 in a downwardly moving spiral. The air will move downwardly in a spiral and then upwardly in a spiral of smaller diameter, and during its movement will evaporate the moisture contained in the atomized particles of the liquid product. The spray member 23 has nozzle carrying arms 40 that are shaped to form a fan blade, as shown in Fig. 2, for exhausting air from the chamber 12. The air will pass axially upwardly into a conduit 25, which delivers the same into a snail 26 above the first stage evaporator 11. The snail causes the air to enter the top of the evaporator 11 in the form of a spiral discharged across the distributor mechanism 21 in the manner described with reference to the movement of the air and liquid in the second stage evaporator 12.

The air passes out of the first stage evaporator 11 upwardly into a conduit 27, and from the conduit through the heat exchanger 15 downwardly into the condenser 16 and back through the heat exchanger 15 through conduits 28 and 29 back into the fan 14, thus completing the circuit.

The air, in passing through the second stage evaporator, will be above its saturation point. It is then conducted through the first stage evaporator, where it absorbs moisture from the raw product and becomes substantially saturated. Since the air circulating system is a closed one, it is necessary to provide means for removing the moisture absorbed in the evaporator 11 and dehydrator 12. The air from the first stage evaporator 11 is conducted through the heat exchanger 15 and through a condenser 16 through which cold water is circulated. Moisture is removed in both the heat exchanger and condenser. From the condenser 16 the air flows through the conduit 28, heat exchanger 15, conduit 29, and back to the fan. As the air flows through the heat exchanger from the conduit 28, it is heated by the air flowing downward through the exchanger, which air in turn will have its temperature reduced and some moisture will be precipitated therefrom before it reaches the condenser. The remaining moisture that is removed is precipitated in the condenser.

The desiccated or dehydrated liquid product collects in the lower portion of the dehydrator 12 and is adapted to be removed through a rotary valve 31 into a conduit 32, from whence it is conveyed to the cooler or collector 17 by a current of air introduced into the conduit 32 by a fan 33. This air, introduced through the fan 33, cools the product, and the product is separated from the air in the cyclone collector 17 in the usual manner.

Since the specific details of the evaporating or dehydrating mechanism constitute no part of the present invention, but are merely disclosed as illustrating one method of performing the process, it is not thought necessary to further illustrate or describe the same.

It is not known why the addition of proteins will affect the products so that they may be dehydrated by the use of air or other gases in the cyclone type of dehydrators, and any suggestions herein made are not to be construed as words of limitation. The above is a description of what has been done, but the reason for the changes in the characteristics of the product is not clear. The following is offered as a mere suggestion of a possible reason.

It is known that solutions of proteins are usually in colloidal state, the particles being held in suspension; and that they, or at least certain types of them, have an affinity for water. It is also a theory that the particles of a colloid carry charges of electricity. These charges cause the particles of the colloid to repel one another, thereby preventing agglomeration. These electric charges may be discharged by salts or by certain acids. It is probable that when the protein particles, which, being colloidal and probably charged, are brought into contact with the liquid product, they may have their charge dissipated by the salts and acid of the product. Then these protein particles may collect on the surface of the individual particles of the product, where they mechanically prevent the surface of the juice particles from becoming tacky, or due to their affinity for water, may absorb the moisture from the surface of the juice particles and give the same up to the heated air during the final stages of the drying operation, thereby preventing the surface of those particles from becoming tacky.

But whatever may be the theory, the surface of the particles of liquid product, when treated with proteins, is prevented from becoming tacky and sticking to the walls of the dehydrator, whereby the product may be dehydrated in a continuous process and in a commercial and practical manner. Likewise a product is produced that is non-hygroscopic.

While the terms "fruits" and "vegetables" are employed, these terms are not intended to be mutually exclusive, as some edibles of the vegetable kingdom may be regarded as either a vegetable or as a fruit, as, for instance, tomatoes. The term "meats" is employed to include edible products obtained from the animal kingdom.

The invention has been disclosed in connection with foods, but this is for the purpose of disclosure, and it is understood that the method may be employed in dehydrating any products that are normally hygroscopic in their dehydrated condition.

This application is a continuation in part of my application Serial No. 317,351, filed February 5, 1940.

It is thought from the foregoing, taken in connection with the accompanying drawing, that the construction and operation of my device will be apparent to those skilled in the art, and that changes in size, shape, proportion and detail may be made without departing from the spirit and scope of the appended claims.

I claim as my invention:

1. A method of dehydrating fruits and vegetables and juices of the same by mixing proteins therewith, the solid content of which is equivalent to not less than 25% of the solid content of the dehydrated product, and then evaporating the moisture from the mixture.

2. A dehydrated fruit juice product comprising a powder of fine particles that are non-hygroscopic, the solid portion of which comprises substantially 25% protein and the remainder being dehydrated citrus juice.

3. A dehydrated fruit juice product comprising a dehydrated mass that is non-hygroscopic, substantially 25% of which is protein and the remaining 75% of the mass being dehydrated tomato juice.

4. A dehydrated vegetable juice product comprising a non-hygroscopic dried mass, 25% of which is protein and the remaining 75% of the mass being solid orange juice product, the dehydrated product being substantially uniform in composition throughout its mass.

5. A method of dehydrating orange juice which comprises extracting the juice, promptly adding to the same a quantity of proteins in such an amount that substantially 25% of the final dehydrated product is protein, mixing the mass, dehydrating the mass by spraying the juice and proteins into a current of heated air, and finally separating the same from the air and then cooling the product.

6. A method of dehydrating orange juice which comprises extracting the juice from the oranges, immediately thereafter adding proteins extracted from soy beans to an amount substantially equal to 25% of the dehydrated product, thoroughly agitating the mass, then promptly spraying the mass into a moving current of air, separating the dehydrated particles from the air, and finally cooling the dehydrated particles.

7. A dehydrated fruit juice product comprising a powder of fine particles that are non-hygroscopic, the solid portion of which comprises substantially 25% protein and the remainder being dehydrated citrus juice.

8. A dehydrated fruit juice product comprising a dehydrated mass that is non-hygroscopic, substantially 25% of which is protein and the remaining 75% of the mass being dehydrated tomato juice.

9. A dehydrated vegetable juice product comprising a non-hygroscopic dried mass, 25% of which is protein and the remaining 75% of the mass being a dehydrated orange juice product, the dehydrated product being substantially uniform in composition throughout its mass.

10. A method of obtaining a dehydrated non-hygroscopic food product in powder form from a material that is normally tacky at an intermediate stage of dehydration, which includes the steps of mixing with said material a substantially tasteless proteinaceous food product, substantially free from oil content, in a quantity sufficient to prevent the material from becoming tacky, and then dehydrating the mixture.

11. A method of obtaining a dehydrated non-hygroscopic food product in powder form from a material that is normally tacky at an intermediate stage of dehydration, which includes the steps of mixing with said material soy bean protein, substantially free from oil content, in a quantity sufficient to prevent the material from becoming tacky, and then dehydrating the mixture.

JOSEPH M. HALL.